(12) United States Patent
Palumbo et al.

(10) Patent No.: US 12,316,111 B2
(45) Date of Patent: May 27, 2025

(54) SYSTEM AND METHOD FOR FACILITATING AUTONOMOUS OPERATION OF A SMART ENERGY DEVICE

(71) Applicant: Kitu Systems, Inc., San Diego, CA (US)

(72) Inventors: Katherine Killen Palumbo, San Diego, CA (US); Gordon Ming Lum, San Diego, CA (US); Christine Canamo Leclercq, San Diego, CA (US)

(*) Notice: Subject to any disclaimer, the term of this patent is extended or adjusted under 35 U.S.C. 154(b) by 0 days.

(21) Appl. No.: 17/933,333

(22) Filed: Sep. 19, 2022

(65) Prior Publication Data

US 2023/0014396 A1 Jan. 19, 2023

Related U.S. Application Data

(63) Continuation of application No. 17/317,743, filed on May 11, 2021, now Pat. No. 11,495,993.

(51) Int. Cl.
*G05B 13/02* (2006.01)
*H02J 13/00* (2006.01)

(52) U.S. Cl.
CPC ...... *H02J 13/00028* (2020.01); *G05B 13/024* (2013.01)

(58) Field of Classification Search
None
See application file for complete search history.

(56) References Cited

U.S. PATENT DOCUMENTS

| | | | |
|---|---|---|---|
| 7,075,261 B2* | 7/2006 | Burstein | F04D 27/008 318/400.11 |
| 8,369,998 B2* | 2/2013 | Drake | H04L 12/2829 700/291 |
| 8,957,634 B2* | 2/2015 | Lo | H02J 7/0013 700/286 |
| 9,680,334 B2* | 6/2017 | Toya | H02J 7/35 |

(Continued)

FOREIGN PATENT DOCUMENTS

| | | | | |
|---|---|---|---|---|
| JP | 2011088399 A | * | 5/2011 | |
| WO | WO-2014017832 A1 | * | 1/2014 | G06Q 50/06 |

OTHER PUBLICATIONS

IEEE Communications Society, "IEEE Standard for Smart Energy Profile Application Protocol", 2018, IEEE Std2030.5TM, pp. 1-359 (Year: 2018).*

*Primary Examiner* — Jason Lin

(74) *Attorney, Agent, or Firm* — Wang Hardoon, P.C.

(57) ABSTRACT

A smart energy device performs a method which includes executing, during a first time period, a first control event wherein an operational parameter of the smart energy device is controlled by the first control event during a first time period. A second control event is then executed, during a second time period, wherein the operational parameter of the smart energy device is controlled by the second control event during a second time period beginning at an end of the first time period. In response to detection of a first defined trigger condition, the method includes opting out of control of the operational parameter of the smart energy device by the second control event and transitioning to control of the operational parameter of the smart energy device by the first control event during a third time period following the detection of the first defined trigger condition.

15 Claims, 6 Drawing Sheets

- Loss of network in this case refers to the inability to receive the DeviceCapability resource for a configured amount of time.
- Return to network means the device was once again able to receive the Device Capability resource
- Default behavior defined by in-band mechanism (DefaultDERControl)
- Opt-out trigger defined as loss of network connectivity to IEEE 2030.5 server
- Device configured not to return to existing active event when trigger is cleared (e.g., opt-in is disabled)
- Note that the Response resource includes a timestamp and can be sent following return to network connectivity

(56) References Cited

U.S. PATENT DOCUMENTS

| | | | | |
|---|---|---|---|---|
| 9,800,463 B2* | 10/2017 | Imes | H04L 41/0813 |
| 9,995,594 B2* | 6/2018 | Fawaz | G01D 4/002 |
| 10,437,206 B2* | 10/2019 | Abe | G05B 15/02 |
| 10,782,722 B2* | 9/2020 | Hohm | H04L 67/125 |
| 2004/0098171 A1* | 5/2004 | Horst | G05B 15/02 |
| | | | 700/295 |
| 2007/0055760 A1* | 3/2007 | McCoy | H04L 41/22 |
| | | | 709/223 |
| 2009/0187499 A1* | 7/2009 | Mulder | G06Q 10/00 |
| | | | 705/30 |
| 2011/0022239 A1* | 1/2011 | Forbes, Jr. | G06Q 10/00 |
| | | | 700/286 |
| 2011/0029655 A1* | 2/2011 | Forbes, Jr. | G08C 15/06 |
| | | | 709/223 |
| 2011/0264932 A1* | 10/2011 | Park | H04L 12/2827 |
| | | | 713/310 |
| 2012/0022709 A1* | 1/2012 | Taylor | H02J 3/144 |
| | | | 700/295 |
| 2013/0008893 A1* | 1/2013 | Little | H05B 6/681 |
| | | | 219/702 |
| 2014/0277769 A1* | 9/2014 | Matsuoka | F24F 11/46 |
| | | | 700/278 |
| 2015/0019032 A1* | 1/2015 | Koch | G05B 15/02 |
| | | | 700/286 |
| 2018/0041824 A1* | 2/2018 | Kakuda | G05F 1/67 |
| 2019/0348851 A1* | 11/2019 | Sethi | H02J 7/00 |
| 2021/0200175 A1* | 7/2021 | Matsumura | H02J 3/144 |
| 2022/0352717 A1* | 11/2022 | Ren | F24H 7/002 |

\* cited by examiner

SYSTEM AND METHOD FOR FACILITATING AUTONOMOUS OPERATION OF A SMART ENERGY DEVICE

CROSS-REFERENCE TO RELATED APPLICATIONS

This application is a continuation of U.S. application Ser. No. 17/317,743, filed May 11, 2021, the disclosure of which is hereby incorporated by reference in its entirety.

FIELD

This disclosure relates generally to smart energy devices connected to an electrical power grid and, more particularly, to control of such devices.

BACKGROUND

Utilities and industry stakeholders have worked together to develop the IEEE 2030.5 communication protocol. This protocol prescribes certain methods and mechanisms for controlling smart energy devices such as, for example, distributed energy resources (DERs) and electric vehicle supply equipment (EVSE), via time-based controls and default controls. This enables smart energy devices to more rapidly respond to energy parameters and may facilitate some forms of remote control. The IEEE 2030.5 protocol also defines methods for smart energy devices to provide status information reflecting their behavior.

SUMMARY

Systems and methods enabling smart energy devices configured for execution of standardized control events to operate autonomously are disclosed herein. Such autonomous operation is facilitated by a client application instantiated on the smart energy device. The client application functions to cause the device to autonomously opt-in and opt-out of execution of control events under specified conditions. In contrast to systems in which control events provided by a server are primarily or exclusively determinative of device behavior, the client application detects such conditions and responsively causes the smart device to transition between such control events in a manner configurable by a user or third party having access to the smart energy device. The smart energy device may comprise, for example, a distributed energy resource or a unit of electric equipment.

In one aspect the disclosure is directed to a method performed by a smart energy device. The method includes executing, during a first time period, a first control event wherein an operational parameter of the smart energy device is controlled by the first control event during a first time period. A second control event is then executed, during a second time period, wherein the operational parameter of the smart energy device is controlled by the second control event during a second time period. The second time period begins at an end of the first time period. The occurrence of a first defined trigger condition may then be detected during the second time period. In response to detection of the first defined trigger condition, the method includes opting out of control of the operational parameter of the smart energy device by the second control event and transitioning to control of the operational parameter of the smart energy device by the first control event. The method further includes executing, during a third time period, the first control event wherein the third time period begins at a first defined time following the detection of the first defined trigger condition.

The method may further include detecting, during the third time period, a second defined trigger condition and opting in, in response to detection of the second defined trigger condition, to control of the operational parameter of the smart energy device by the second control event. In this way the operational parameter of the smart energy device is controlled by the second control event during a fourth time period. The fourth time period may begin at a second defined time following the detection of the second defined trigger condition, the second control event being of higher priority than the first control event.

The method may further include generating, upon expiration of a time interval associated with the second control event, a partial completion response indicative of partial completion of the second control event. Execution of the first control event may then resume upon the expiration of the time interval associated with the second control event. The method may also include generating a first time-stamped response indicating execution of the second control event has started, a second time-stamped response indicating opt-out of the second control event in response to the detection of the first defined trigger condition, and a third time-stamped response indicating opt-in to the second control event in response to the detection of the second defined trigger condition. The first time-stamped response, the second time-stamped response and the third time-stamped response may be sent to a server.

In one aspect of the method the first control event and the second control event are received from a server. Alternatively, the first control event may be received from the server and the second control event may be provided by an out-of-band mechanism not involving the server. The first control event may be defined in accordance with the IEEE 2030.5 standard.

The disclosure also relates to a method performed by a smart energy device which involves receiving a plurality of control events from a server. The method includes executing, during a first time period, a first control event of the plurality of control events wherein an operational parameter of the smart energy device is controlled by the first control event during a first time period. A second control event of the plurality of control events is executed during a second time period wherein the operational parameter of the smart energy device is controlled by the second control event during a second time period. The second time period begins at an end of the first time period. The method further includes detecting, during the second time period, occurrence of a first defined trigger condition. In response to detection of the first defined trigger condition, the method includes opting out of control of the operational parameter of the smart energy device by the second control event and transitioning to control of the operational parameter of the smart energy device by a third control event. The third control event may then be executed during a third time period following the second time period, the third control event being provided by an out-of-band mechanism not involving the server.

In another aspect the disclosure pertains to a smart energy device including a processor, a communication interface and a memory including a client application having instructions. When executed by the processor, the instructions cause the processor to control, during a first time period, an operational parameter of the smart energy device by executing a first control event during a first time period and to control, during a second time period, the operational parameter of the smart energy device by executing a second control event during a second time period. The second time period begins at an end of the first time period. When executed the instructions further cause the processor to detect, during the second time period, occurrence of a first defined trigger condition. Such execution of the instructions further causes the processor to opt out, in response to detection of the first defined trigger condition, of control of the operational parameter of the smart energy device by the second control event and to transition to control of the operational parameter of the smart energy device by the first control event. The execution of the instructions further induces the processor to control, during a third time period, the operational parameter of the smart energy device by executing the first control event. The third time period begins at a first defined time following the detection of the first defined trigger condition.

The disclosure is further directed to a smart energy device including a processor, a communication interface and a memory including a client application having instructions. When executed by the processor, the instructions cause the processor to receive, from a server via the communication interface, a plurality of control events and to control, during a first time period, an operational parameter of the smart energy device by executing a first control event during a first time period. When executed the instructions further cause the processor to control, during a second time period, the operational parameter of the smart energy device by executing a second control event during a second time period. The second time period begins at an end of the first time period. Execution of the instructions further induces the processor to detect, during the second time period, occurrence of a first defined trigger condition and to opt out, in response to detection of the first defined trigger condition, of control of the operational parameter of the smart energy device by the second control event. Such execution of the instructions further results in transitioning to control of the operational parameter of the smart energy device by a third control event. The processor is further caused, upon executing the instructions, to control, during a third time period beginning at an end of the second time period, the operational parameter of the smart energy device by executing the third control event. In this case the third control event is provided by an out-of-band mechanism and is not received from the server.

BRIEF DESCRIPTION OF THE DRAWINGS

For a better understanding of the nature and objects of various embodiments of the invention, reference should be made to the following detailed description taken in conjunction with the accompanying drawings, wherein.

DETAILED DESCRIPTION

The disclosure pertains to a system and method for facilitating autonomous operation of a smart energy device. Such autonomous operation may be affected by configuring the smart energy device to be capable of autonomously opting in to execute various control events and autonomously opting out of execution of such events. The opt-in/opt-out behavior of the smart energy device may be controlled by establishing conditions under which the smart device will initiate or terminate execution of control events.

Figure 1:
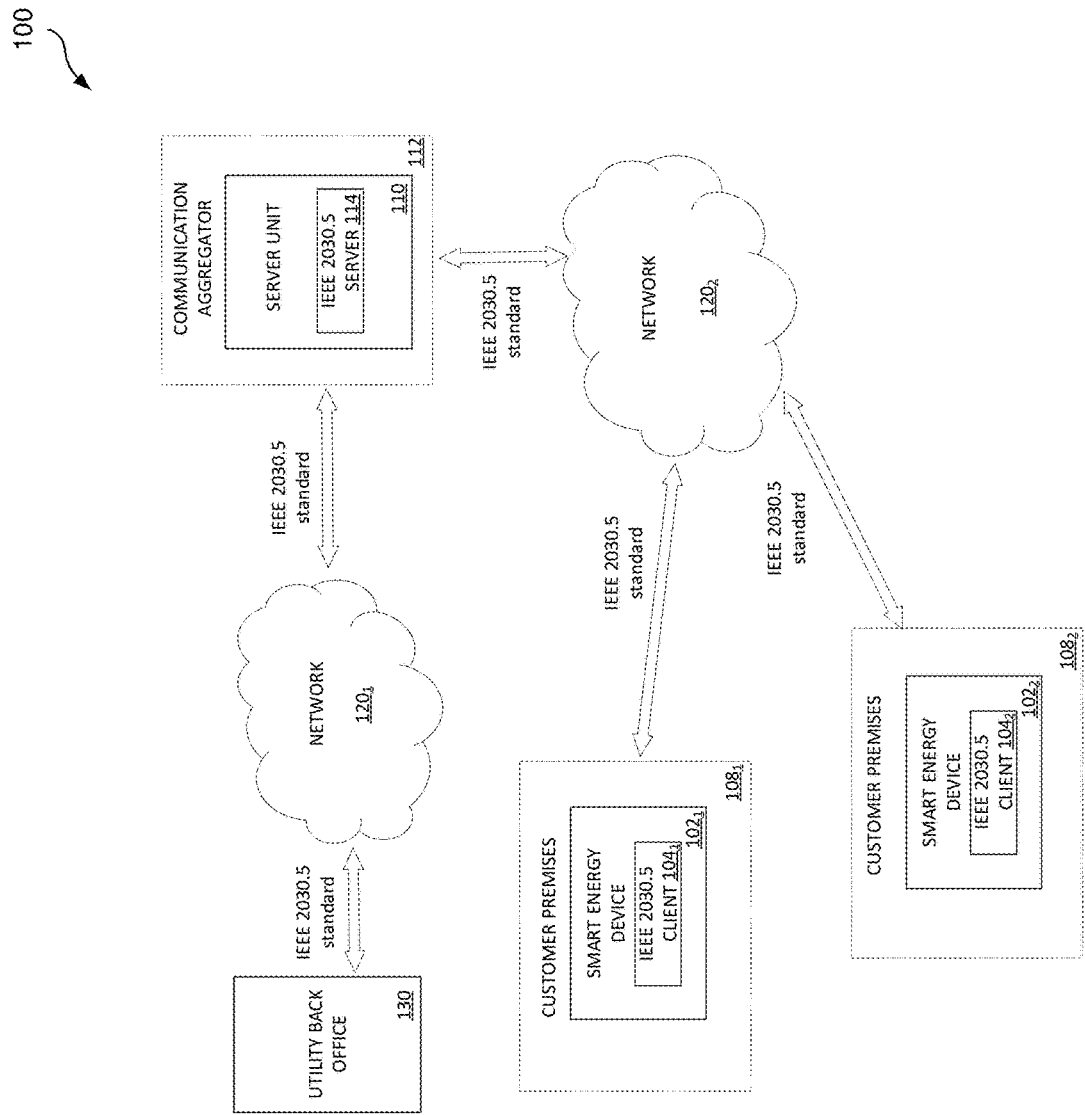
FIG. 1 illustrates a system configured to facilitate autonomous operation of smart energy devices in accordance with an embodiment.

FIG. 1 illustrates a system 100 configured to facilitate autonomous operation of smart energy devices 102 in accordance with an embodiment. As is discussed herein, such autonomous operation may be facilitated by configuring the smart energy devices 102 to autonomously opt-in to, and opt-out of, various time-based controls governing operation of the smart energy devices 102. In one embodiment at least certain of such time-based controls comport with the IEEE 2030.5 standard and are provided by an IEEE 2030.5 server 114 to IEEE 2030.5 clients 104 of the smart energy devices 102. Each smart energy device 102, which may be located at a customer premises 108 (e.g., the premises of a customer of a utility 130), may comprise, for example, a distributed energy resource (DER), electric vehicle supply equipment (EVSE), or other electrical device (e.g., a smart thermostat) configured to implement time-based controls.

As shown in FIG. 1, the IEEE 2030.5 server 114 may be included within a server unit 110 operated by a communications aggregator 112 in communication with a back office of the utility 130 and the smart energy devices 102 over one or more networks 120. The networks 120 may be any wired or wireless network and will generally include the Internet.

Figure 2:
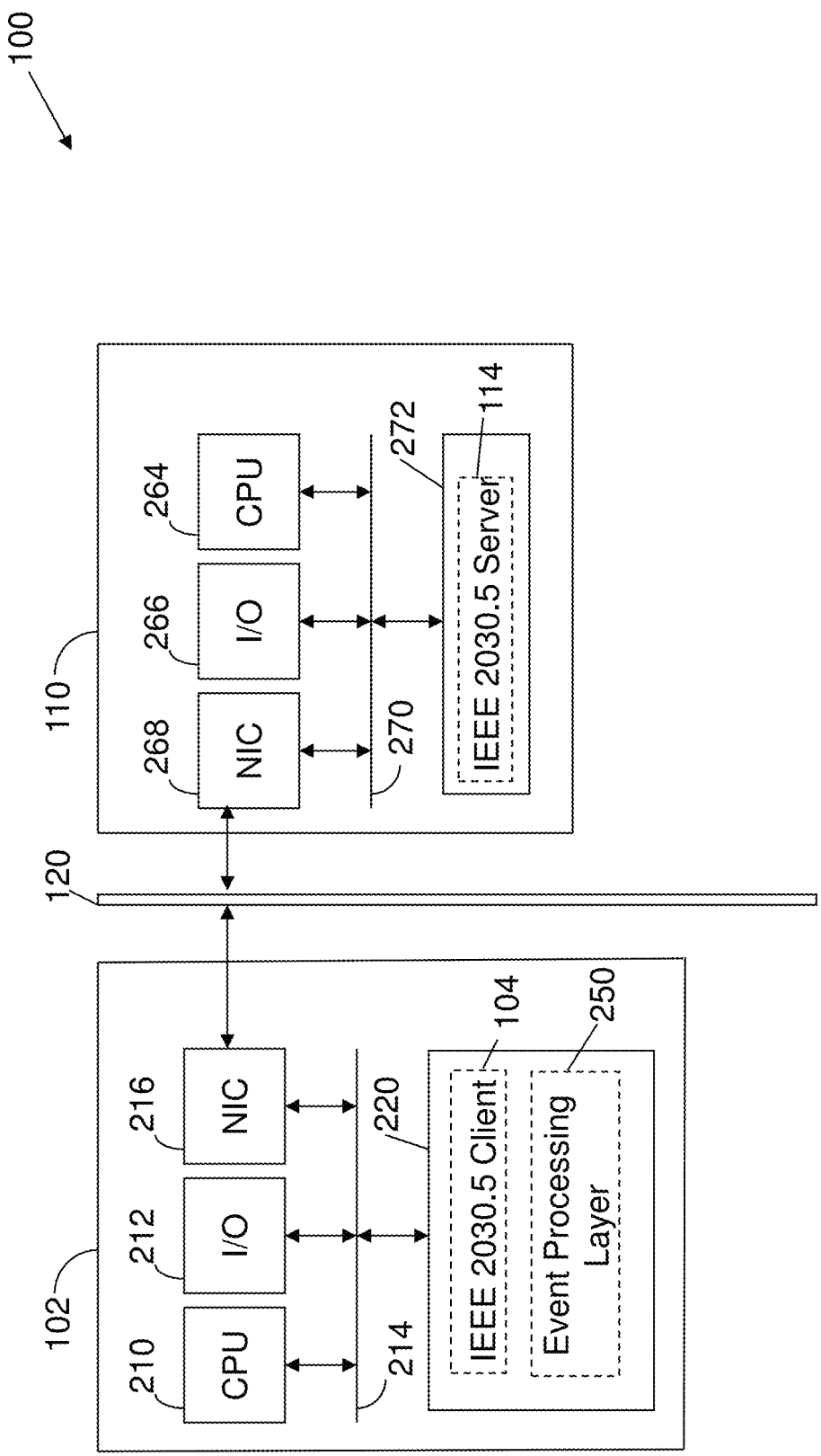
FIG. 2 is a block diagram providing additional details of exemplary implementations of smart energy devices and a server unit.

FIG. 2 is a block diagram providing additional details of exemplary implementations of the smart energy devices 102 and the server unit 110. Each smart energy device 102 may include a processor (e.g., a central processing unit) 210 and input/output devices 212 connected via a bus 214. The input/output devices 212 may include user-actuatable buttons or switches, and/or a touch display and the like. A network interface circuit 216 is also connected to the bus 214 to provide connectivity to network 120. A memory 220 is also connected to the bus 214. The memory 220 stores instructions executed by the processor 210 to implement operations disclosed herein. In particular, the memory 220 stores the IEEE 2030.5 client application 104, which is configured to execute IEEE 2030.5 controls received from the IEEE 2030.5 server 110, as well as other controls (e.g., controls stored within the device 102 at the time of manufacture or installation, or controls provided by third parties). In one embodiment the IEEE 2030.5 client application 104 is included within an application layer of a multi-layer software architecture defined within the memory 220. In addition to the such an application layer, the multi-layer architecture may include an IEEE 2030.5 event processing layer 250. See, e.g., IEEE 2030.5-2018, Section 10.2.3 ("Event rules and guidelines").

As shown in FIG. 2, the server unit 110 includes standard components, such as a central processing unit 264, input/output devices 266 and one or more network interface circuits 268 in communication over a bus 270. A memory 272 is also connected to the bus 270. The memory 272 stores executable instructions to implement the IEEE 2030.5 server 114.

The present inventors have recognized that there are cases in which it would be advantageous for smart energy devices or other devices communicating via an established communication protocol to behave in ways beyond the normal event handling procedures defined in the protocol specification. For example, in certain cases it would be desirable for such devices to implement specialized device behavior. It would be further desirable to maintain compliance with an existing protocol specification, such as the IEEE 2030.5 specification, by using the framework provided by the specification in conjunction with specialized application behavior. In addition, such specialized application behavior would preferably utilize mechanisms described in the specification to ensure a server comporting with the specification is aware of the device behavior. The present disclosure provides a system and method for enabling this type of behavior within the framework of an established communication protocol such as, for example, the IEEE 2030.5 communication protocol.

By way of background, the IEEE 2030.5 communication protocol defines a Response function set that is sent to an IEEE 2030.5 server by a smart energy device operating in accordance with the IEEE 2030.5 specification in order to indicate the status of a time-based control event on the device. Such Responses may indicate that the smart energy device has, for example, received, started, and/or completed the control event. In addition to such basic Responses, the IEEE 2030.5 specification defines various user-based Responses to DRLC or DER events. See Table 1 below and Table 27 of the IEEE 2030.5 specification (IEEE-2030.5-2018).

TABLE 1

| Enumerated Value | Description | Why Sent | When Sent |
|---|---|---|---|
| 4 | User has chosen to opt-out | To notify response server that user has chosen to opt out of the event. Can occur before event begins | At time user actively chose to opt out or when device automatically opts out due to user preference |
| 5 | User has chosen to opt-in | To notify response server that user has chosen to opt in to the event (after a previous opt-out). Can occur before event begins | At time user actively chose to opt in or when device automatically opts in due to user preference |
| 8 | Event partially completed with user opt-out | To notify response server that some participation in the event occurred, but not complete participation, due to one or more user opt-outs | At EffectiveEndTime of the event |
| 9 | Event partially completed due to user opt-in | To notify response server that some participation in the event occurred, but not complete participation, due to one or more user opt-ins (after a previous opt-out) | At EffectiveEndTime of the event |

In Table 1, EffectiveEndTime is defined as "the time at which an Event's interval attribute indicates completion based on the Effective Start Time, plus Duration, plus any applied Duration Randomization offsets (which may be a positive or negative value) as calculated by the Client.". See Section 10.2.3.2, IEEE 2030.5-2018.

As may be appreciated from Table 1, the Response function set defined by the IEEE 2030.5 specification provides a mechanism by which a user of a smart energy device may, by interacting with the smart energy device, decide to opt-in or opt-out of a particular control event controlling an aspect or parameter of the operation of the device. As described hereinafter, the present disclosure provides a system and method for enabling a smart energy device to autonomously opt-in and/or opt-out of control events without user intervention.

Figure 3:
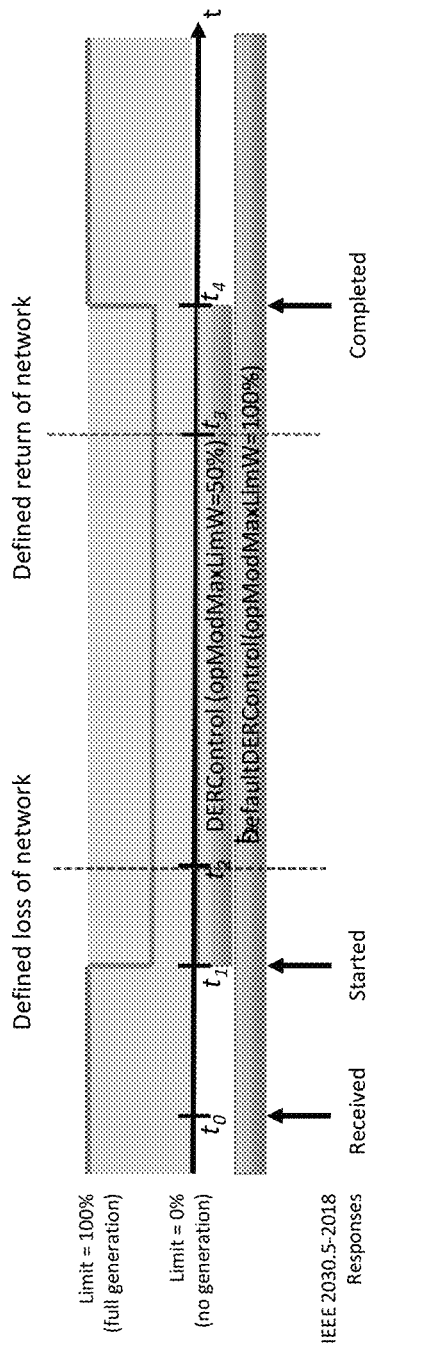
FIG. 3 illustrates conventional behavior of a smart energy device in response to various control events in a case in which the smart energy device experiences a temporary loss of network connectivity with a server.

Attention is now directed to FIG. 3, which illustrates conventional behavior of a smart energy device 102 in response to various control events in a case in which the smart energy device 102 experiences a temporary loss of network connectivity with the server unit 110. In the example of FIG. 3, the control events comprise DERControls received by the device 102 from the IEEE 2030.5 server 114. A DERControl is an IEEE 2030.5 control event that contains a start time, a duration, and a control parameter value. Examples of DERControl resources are the real power output limit control DERControl:opModMaxLimW and the fixed power factor control event DERControl:opModFixedPF. A DefaultDERControl is an IEEE 2030.5 control resource that is in effect if there are no active DERControls for that resource. For example, the DefaultDERControl:opModFixedPF resource is in effect when there are no DERControl:opModFixedPF events active, and the DefaultDERControl:opModMaxLimW resource is in effect when there are no DERControl:opModMaxLimW events active.

In the example of FIG. 3, the smart energy device 102 may be configured to be limited to power generation levels ranging from 0% (no generation) up to and including a limit of 100% (full generation). As shown, the smart energy device 102 is initially limited to operating at full generation capacity in accordance with the DefaultDERControl (opModMaxLimW=100%) control event, which sets the power generation limit of the device 102 at 100%. During this time the smart energy device 102 receives an IEEE 2030.5 control event in the form of DERControl(opModMaxLimW=50%). When active, the control function opModMaxLimW=50% of this DERControl limits the power generation level of the smart energy device 102 to 50% of the full generation level. As shown in FIG. 3, at a time t0 the smart energy device 102 sends an IEEE 2030.5 Received Response to the IEEE 2030.5 server 114 upon receiving the DERControl(opModMaxLimW=50%) control event. At the start time of the DERControl(opModMaxLimW=50%) control event (i.e., at a time $t_1$) the power generation limit of the smart energy device 102 is reduced from 100% to 50%. At time $t_1$ the smart energy device 102 also sends an IEEE 2030.5 Started Response to the IEEE 2030.5 server 114. This Response informs the IEEE 2030.5 server 114 that the smart energy device 102 has initiated execution of the DERControl(opModMaxLimW=50%) control event at the appointed start time.

As shown in FIG. 3, shortly after the DERControl(opModMaxLimW=50%) control event has come into effect, a defined loss of network occurs at a time $t_2$. In this case loss of network refers to the inability of the smart energy device 102 to receive the DeviceCapability resource provided by the IEEE 2030.5 server 114 for a configured amount of time. As indicated by FIG. 3, a defined return to network occurs some time later at a time $t_3$ once the smart energy device 102 again becomes able to receive the Device Capability resource from the IEEE 2030.5 server 114. During the period between the defined loss of network and the defined return of network (i.e., between times $t_2$ and $t_3$), the smart energy device 102 continues with normal event handling in accordance with the IEEE 2030.5 specification. Once the duration associated with the DERControl(opModMaxLimW=50%) control event has expired (i.e., at a time $t_4$), the power generation level of the smart energy device 102 is again set by the DefaultDERControl(opModMaxLimW=100%) control event to 100% (full generation). In addition, the smart energy device 102 also sends a Completed Response to the IEEE 2030.5 server 114 upon expiration of the duration of the DERControl(opModMaxLimW=50%) control event at the time $t_4$; however, the smart energy device 102 as conventionally configured does not inform the IEEE 2030.5 server 114 of the loss of network connectivity occurring during execution of the DERControl (opModMaxLimW=50%) control event. Moreover, to the extent that other controls (not shown in FIG. 4) are scheduled for execution during the period of lost network connectivity between times $t_2$ time $t_3$, there currently exists no mechanism for altering the behavior of the device 102 in the event of such a loss in connectivity or of reporting which scheduled controls actually were partially or fully completed.

Figure 4:
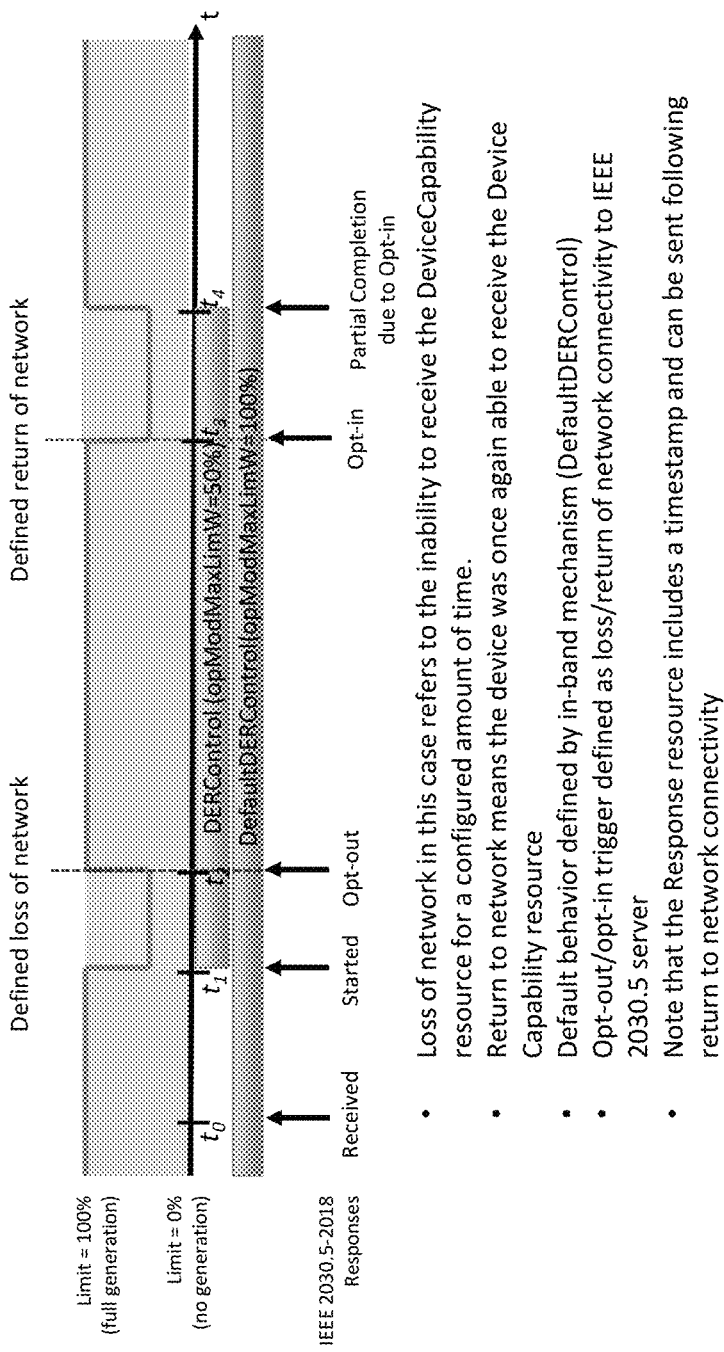
FIG. 4 illustrates one manner in which a smart energy device configured in accordance with an embodiment opts outs of, and opts in to, various control events in a case in which the smart energy device experiences a temporary loss of network connectivity with a server.

Attention is now directed to FIG. 4, which illustrates one manner in which a smart energy device 102 may, in accordance with an embodiment, opt-out of, and opt-in to, various control events in a case in which the smart energy device 102 experiences a temporary loss of network connectivity with the server unit 110. In the example of FIG. 4, the control events again comprise DERControls received by the device 102 from the IEEE 2030.5 server 114 and the power generation levels of the smart energy device 102 may again be limited to a level of 0% (no generation) up to and including a level of 100% (full generation). As shown, the power generation capability of the smart energy device 102 is initially set to a level of 100% (full generation) by the DefaultDERControl(opModMaxLimW=100%) control event upon receiving the DERControl(opModMaxLimW=50%) control event at a time to. Upon receipt of this control event the smart energy device 102 sends, at approximately time to or shortly thereafter, an IEEE 2030.5 Received Response to the IEEE 2030.5 server 114. At a start time $t_1$ of the DERControl(opModMaxLimW=50%) control event, the power generation limit of the smart energy device 102 is reduced from 100% to 50% as the device 102 transitions to control by the DERControl(opModMaxLimW=50%) control event. At approximately this time $t_1$ the smart energy device 102 also sends an IEEE 2030.5 Started Response to the IEEE 2030.5 server 114. This Response informs the IEEE 2030.5 server 114 that the smart energy device 102 has initiated execution of the DERControl(opModMaxLimW=50%) control event at the appointed start time of $t_1$.

As shown in FIG. 4, shortly after the device 102 begins executing the DERControl(opModMaxLimW=50%) control event at time $t_1$ and the power generation limit of the smart energy device 102 is reduced from 100% to 50%, a defined loss of network occurs at a time $t_2$. Again, loss of network in this example refers to the inability of the smart energy device 102 to receive the DeviceCapability resource provided by the IEEE 2030.5 server 114 for a configured amount of time. Of course, in other embodiments a loss of network could be defined by different criteria and detected by other means. In the embodiment of FIG. 4, the client application 104 of the smart energy device 102 is configured with a triggering condition causing the device 102 to, upon detection of this loss of network condition, opt-out of the DERControl(opModMaxLimW=50%) control event and transition to control by, and execution of, the DefaultDERControl(opModMaxLimW=100%) control event. The smart energy device 102 is also configured to generate, at a time $t_2$, a time-stamped Opt-out Response upon being triggered to so opt-out of the DERControl(opModMaxLimW=50%) control event. This time-stamped Opt-out Response is then queued by the smart energy device 102 until network connectivity with the IEEE 2030.5 server 114 is restored and the smart energy device is able to send the queued Opt-out Response to the IEEE 2030.5 server 114. Of course, in other embodiments the device 102 may be configured with entirely different types of triggering conditions (e.g., alarm-based conditions, temperature-based conditions, and the like).

As indicated by FIG. 4, a defined return of network subsequently occurs at a time $t_3$ once the smart energy device 102 again becomes able to receive the Device Capability resource from the IEEE 2030.5 server 114. In accordance with an embodiment, the smart energy device 102 operating as shown in FIG. 4 is configured with another triggering condition causing it to, upon detection of this defined return of network condition at time $t_3$, opt-in to limiting of its power generation level by the DERControl (opModMaxLimW=50%) control event. Upon the smart energy device 102 resuming execution of the DERControl (opModMaxLimW=50%) control event, the power generation limit of the device 102 is reduced from 100% to 50%. The smart energy device 102 is also configured to generate, at time $t_3$, a time-stamped Opt-in Response upon being triggered to so opt-in to the DERControl(opModMaxLimW=50%) control event. This time-stamped Opt-in Response and the queued, time-stamped Opt-out Response are then sent to by the device 102 to the IEEE 2030.5 server 114 at approximately time $t_3$ or shortly thereafter. In addition, the smart energy device 102 sends, at a time $t_4$, a Partial Completion due to Opt-in Response to the IEEE 2030.5 server 114 upon expiration of the duration of the DERControl(opModMaxLimW=50%) control event. This Partial Completion Response, which may also be time-stamped, informs the IEEE 2030.5 server 114 that the DERControl (opModMaxLimW=50%) control event was not fully completed. In view of the time-stamped Opt-out, Opt-in and Partial Completion Responses provided to the IEEE 2030.5 server 114, the IEEE 2030.5 server 114 or other module of the server unit 110 may infer that the failure to complete the DERControl(opModMaxLimW=50%) control event was associated with the loss of network connectivity experienced by the smart energy device 102. Upon expiration of the DERControl(opModMaxLimW=50%) control event, the power generation limit of the device 102 transitions to a level set by the DefaultDERControl(opModMaxLimW=100%) control event. As a consequence, the power generation limit of the device 102 is increased from 50% to 100% at time $t_4$.

The above triggering conditions may be defined within the client application 104 of the device 102 at the time production or installation of the device 102. Alternatively or in addition, the triggering conditions may be defined by a third party or user having access to the device 102 subsequent to device installation. In one embodiment various parameters may be associated with such triggering conditions such as, for example, the delay (if any) between detection of a triggering condition and any transition between control events associated with the triggering condition. In addition, such parameters may also include randomization factors associated with the start time or duration of control events associated with the triggering condition, or parameters further defining the manner in which the device 102 transitions between control events over time (e.g., step-based transition, ramp-based transition, multi-step transition, and the like).

Figure 5:
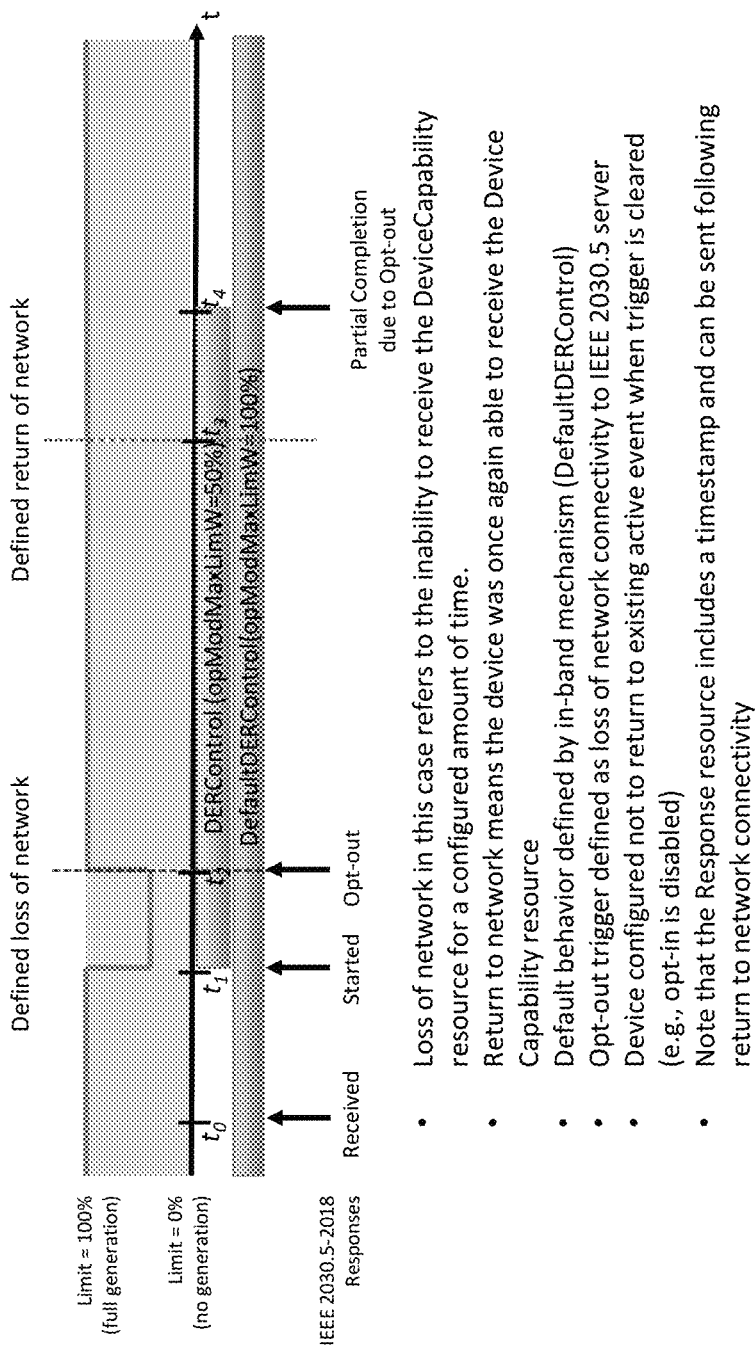
FIG. 5 illustrates another way in which a smart energy device may, in accordance with an embodiment, respond to a temporary loss of network connectivity with the server unit including an IEEE 2030.5 server.

Attention is now directed to FIG. 5, which illustrates another way in which a smart energy device 102 may, in accordance with an embodiment, respond to a temporary loss of network connectivity with the server unit 110 and, more particularly, with the IEEE 2030.5 server 114. As may be appreciated by comparison of FIGS. 4 and 5, the response of the smart energy device 102 in the case of FIG. 5 is substantially similar to the response of the device 102 in the case of FIG. 4. However, in the case of FIG. 5, although the device 102 is configured with a triggering condition causing it to opt-out of the DERControl(opModMaxLimW=50%) control event upon detection of a loss of network condition at time $t_2$, it is not also configured with an additional triggering condition causing it to, upon detection of a defined return of network condition at time $t_3$, opt-in to control by the DERControl(opModMaxLimW=50%) control event (and thereby transition away from control by the DefaultDERControl(opModMaxLimW=100%) control event). Instead, upon opting-out of control by the DERControl(opModMaxLimW=50%) control event upon detection of a loss of network condition and transitioning to control by the DefaultDERControl(opModMaxLimW=100%) control event at time $t_2$, the power generation limit of the smart energy device 102 simply remains under the control of the DefaultDERControl(opModMaxLimW=100%) control event even upon detection of a defined return of network condition at time $t_3$. Stated differently, the device 102 is configured not to return to the existing active event when the trigger resulting in opt-out of such active event is cleared (e.g., opt-in is disabled). Accordingly, in the case of FIG. 5 the smart energy device will send a time-stamped Opt-out Response to the IEEE 2030.5 server 114 upon detection of the defined return of network condition at time $t_3$, and will send a Partial Completion due to Opt-out Response to the IEEE 2030.5 server 114 upon expiration of the duration of the DERControl(opModMaxLimW=50%) control event at time $t_4$. However, unlike in the case of FIG. 4, in the case of FIG. 5 the smart energy device 102 will not send a time-stamped Opt-in Response to the IEEE 2030.5 server 114.

Figure 6:
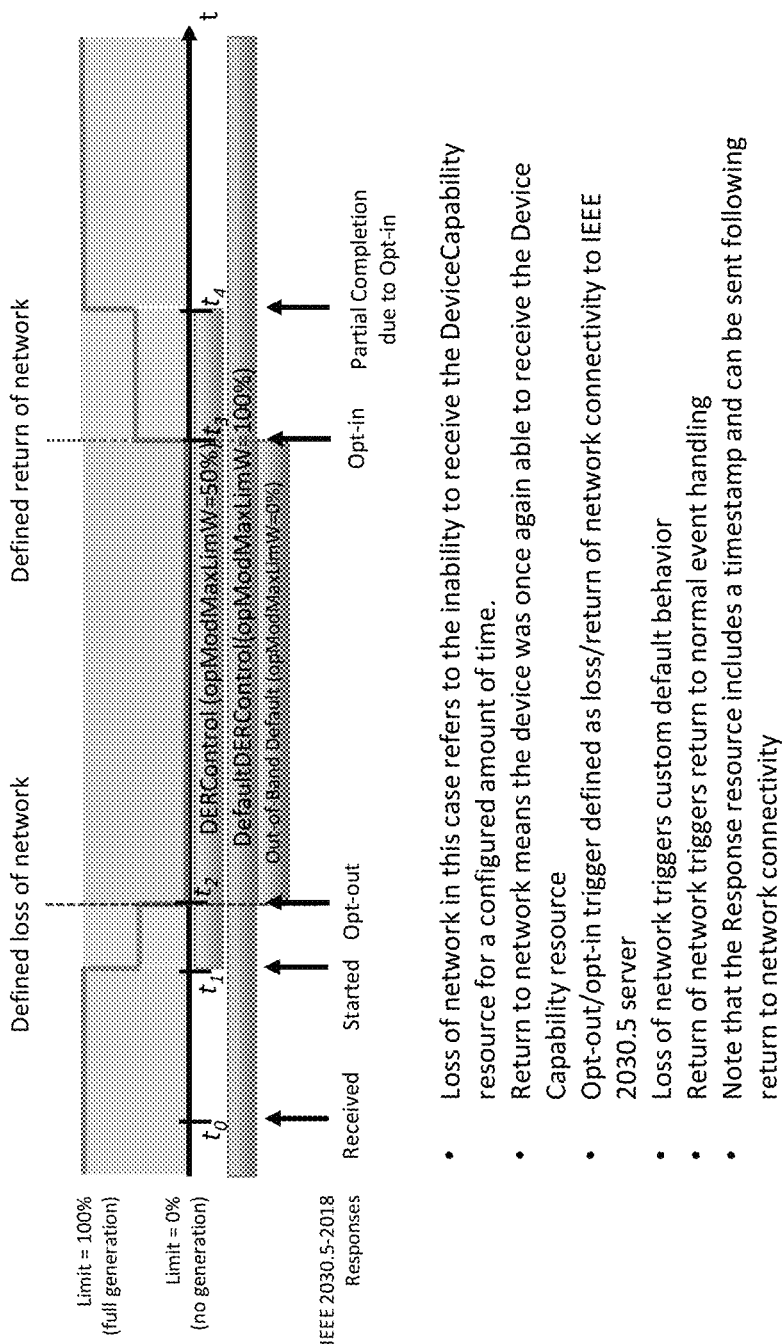
FIG. 6 illustrates exemplary operation of a smart energy device in opting-in to, and opting-out of, various control events, at least one of which defines custom default behavior not included within the IEEE 2030.5 specification or other applicable standard.

FIG. 6 illustrates exemplary operation of the smart energy device 102 in opting-in and opting-out to various control events, at least one of which defines custom default behavior of the device 102 (i.e., behavior not included within the IEEE 2030.5 specification or other applicable standard). In the example of FIG. 6, the control events executed by the device 102 include DERControls received by the device 102 from the IEEE 2030.5 server 114 as well as an out-of-band default control event, i.e., Out-of-Band Default (opModMaxLimW=0%), not provided by the server 114. The out-of-band default control event may be stored within the smart energy device 102 at, for example, the time of its production, installation or subsequent configuration by a user or third party. As is explained below, the device 102 is configured so that this out-of-band default control event sets the power generation limit of the device 102 when it experiences a temporary loss of network connectivity with the server unit 110.

As shown in FIG. 6, the power generation limit of the smart energy device 102 is set at full generation capacity in accordance with the DefaultDERControl(opModMaxLimW=100%) control event when the DERControl(opModMaxLimW=50%) control event is received at time $t_0$. Upon receipt of this control event the smart energy device 102 sends an IEEE 2030.5 Received Response to the IEEE 2030.5 server 114. At the start time $t_1$ of the DERControl(opModMaxLimW=50%) control event, the power generation limit of the smart energy device 102 is reduced from 100% to 50% as the device 102 transitions to control by the DERControl(opModMaxLimW=50%) control event. At this time $t_1$ the smart energy device 102 also sends an IEEE 2030.5 Started Response to the IEEE 2030.5 server 114. This Response informs the IEEE 2030.5 server 114 that the smart energy device 102 has initiated execution of the DERControl(opModMaxLimW=50%) control event at the appointed start time ($t_1$).

As shown in FIG. 6, shortly after the device 102 begins executing the DERControl(opModMaxLimW=50%) control event and the power generation limit of the smart energy device 102 has been reduced from 100% to 50%, a defined loss of network occurs at time $t_2$. In this example loss of network refers to the inability of the smart energy device 102 to receive the DeviceCapability resource provided by the IEEE 2030.5 server 114 for a configured amount of time. In accordance with an embodiment, the smart energy device 102 operating as shown in FIG. 6 is configured with a triggering condition causing it to, upon detection of this loss of network condition, opt-out of the DERControl(opModMaxLimW=50%) control event at time $t_2$ and transition to having its power generation limit set by the Out-of-Band Default(opModMaxLimW=0%) control event. As a consequence, the power generation limit of the smart energy device 102 is reduced from 50% to 0%; that is, the client application 104 of the smart device 102 causes, upon detection of the loss of network condition at time $t_2$, the power generation limit of the device to be determined by the Out-of-Band Default(opModMaxLimW=0%) control event rather than by the DefaultDERControl(opModMaxLimW=100%) control event. The smart energy device 102 is also configured to generate, at time $t_2$, a time-stamped Opt-out Response upon being triggered to so opt-out of the DERControl(opModMaxLimW=50%) control event. This time-stamped Opt-out Response is then queued by the smart energy device 102 until network connectivity with the IEEE 2030.5 server 114 is restored and the smart energy device is able to send the queued Opt-out Response to the IEEE 2030.5 server 114.

As indicated by FIG. 6, a defined return of network occurs at time $t_3$ once the smart energy device 102 again becomes able to receive the Device Capability resource from the IEEE 2030.5 server 114. In accordance with an embodiment, the smart energy device 102 operating as shown in FIG. 6 is configured with another triggering condition causing it to, upon detection of this defined return of network condition at time $t_3$, opt-in to the setting of its power generation limit by the DERControl(opModMaxLimW=50%) control event. Upon the smart energy device 102 beginning execution of the DERControl(opModMaxLimW=50%) control event, the power generation limit of the device 102 is increased from 0% to 50%. The smart energy device 102 is also configured to generate a time-stamped Opt-in Response upon being triggered to so opt-in to the DERControl(opMod- MaxLimW=50%) control event at time $t_3$. This time-stamped Opt-in Response and the queued, time-stamped Opt-out Response are then sent by the device 102 to the IEEE 2030.5 server 114. In addition, the smart energy device 102 sends a Partial Completion Response to the IEEE 2030.5 server 114 upon expiration of the duration of the DERControl(opModMaxLimW=50%) control event at time $t_4$. This Partial Completion Response, which may also be time-stamped, informs the IEEE 2030.5 server 114 that the DERControl(opModMaxLimW=50%) control event was not fully completed. Upon expiration of the DERControl (opModMaxLimW=50%) control event, the power generation limit of the device 102 becomes set by the Default-DERControl(opModMaxLimW=100%) control event. As a consequence, the power generation limit of the device 102 is increased from 50% to 100% at time $t_4$.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The various methods or processes outlined herein may be coded as software that is executable on one or more processors that employ any one of a variety of operating systems or platforms. Additionally, such software may be written using any of a number of suitable programming languages and/or programming or scripting tools and may be compiled as executable machine language code or intermediate code that is executed on a framework or virtual machine.

In this respect, various inventive concepts may be embodied as a non-transitory computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The non-transitory computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

In addition, data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish a relationship between information in fields of a data structure, including through the use of pointers, tags or other mechanisms that establish relationship between data elements.

In addition, various inventive concepts may be embodied as one or more methods, of which an example has been provided. The acts performed as part of the method may be ordered in any suitable way. Accordingly, embodiments may be constructed in which acts are performed in an order different from illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising:
    executing a first control event characterized by a first start time and a first duration defined by a server;
    executing a second control event characterized by a second start time and a second duration defined by the server;
    detecting an alarm condition at a first alarm time, while executing the second control event; responsive to the alarm condition, autonomously opting out of the second control event and transitioning to the first control event for a third time period that begins at the first alarm time;
    queuing a time stamped opt out response at the alarm condition;
    detecting a return condition at a second return time during the third time period;
    transmitting the time stamped opt-out response at the return condition;
    responsive to the return condition, autonomously opting in to the second control event for a fourth time period that begins at the second return time; where an operational parameter of a smart energy device is set based on the first control event and the second control event.

2. The method of claim 1, where the return condition comprises a return of a network connectivity.

3. The method of claim 1, further comprising measuring an ambient temperature or a device temperature, where the alarm condition occurs when at least one of the ambient temperature or the device temperature is outside of an allowed operating range.

4. The method of claim 1, where the alarm condition occurs when a value of the operational parameter is outside of an allowed operating range.

5. The method of claim 1, where the first control event has a first priority level and the second control event has a second priority level greater than the first priority level.

6. A smart energy device, comprising:
    a power component controlled by an operational parameter;
    a communication interface configured to receive a plurality of control events from a server according to a communication protocol, where each control event is associated with a start time and a duration according to the communication protocol;
    a processor; and
    a non-transitory computer-readable medium comprising instructions, which when executed by the processor, cause the processor to: enable the power component according to the operational parameter;
    in response to receiving a first control event from the server, execute the first control event at a first start time and for a first duration set by the server;
    detect a first alarm condition during the first duration;
    responsive to the first alarm condition, autonomously opt out of the first control event and transition to a second control event for a second duration set by a client application;
    queuing a time stamped opt out response at the alarm condition;
    detect a return condition during the second duration;
    transmitting the time stamped opt-out response at the return condition; and
    responsive to the second return condition, autonomously opt in to the first control event.

7. The smart energy device of claim 6, where the smart energy device is a distributed energy resource (DER), an electric vehicle supply equipment (EVSE), or an electrical device configured to implement time-based controls.

8. The smart energy device of claim 6, where the first alarm condition occurs when the smart energy device does not receive a number of periodic messages from the server.

9. The smart energy device of claim 6, where the return condition occurs when the smart energy device receives a periodic message from the server after detection of the first alarm condition.

10. The smart energy device of claim 6, where the instructions further cause the processor to set the operational parameter to a default parameter after detection of the first alarm condition.

11. A method, comprising:
    controlling an operational parameter of a smart energy device for a plurality of time durations based on a corresponding plurality of control events received from a server;
    responsive to an alarm condition detected by the smart energy device, autonomously opting out of a first control event and transitioning to a previously-defined control event for the operational parameter;
    queuing a time stamped opt-out response at the alarm condition;
    responsive to a return condition detected by the smart energy device, autonomously opting in to resume the first control event;

transmitting the time stamped opt-out response at the return condition; and transmitting a time stamped partial completion response at an expiration of the first control event.

12. The method of claim 11, where the previously-defined control event is a default control event.

13. The method of claim 11, where the alarm condition is a loss of network connectivity.

14. The method of claim 13, where the return condition is a return to the network connectivity.

15. The method of claim 11, where the alarm condition is a temperature.

\* \* \* \* \*